US006863455B2

(12) United States Patent
Blom et al.

(10) Patent No.: US 6,863,455 B2
(45) Date of Patent: Mar. 8, 2005

(54) CONTROLLING A PRINTING SYSTEM USING THE PRINT QUEUE

(75) Inventors: Ronald M. N. Blom, Velden (NL); Eduardus J. W. Van Vliembergen, Venlo (NL); Jurek N. Deen, Venlo (NL); Monique G. M. Sommer, Eindhoven (NL); Antonius M. Gerrits, Velden (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 10/472,503

(22) PCT Filed: Mar. 15, 2002

(86) PCT No.: PCT/EP02/03159

§ 371 (c)(1),
(2), (4) Date: Sep. 22, 2003

(87) PCT Pub. No.: WO02/075643

PCT Pub. Date: Sep. 26, 2002

(65) Prior Publication Data

US 2004/0099166 A1 May 27, 2004

(30) Foreign Application Priority Data

Mar. 20, 2001 (EP) .......................................... 01201059

(51) Int. Cl.[7] ................................................ B41J 5/30
(52) U.S. Cl. .......................... 400/61; 400/76; 358/1.13
(58) Field of Search ............................... 400/61–63, 70, 400/74, 76; 358/1.1, 1.2, 1.9, 1.13–1.15

(56) References Cited

U.S. PATENT DOCUMENTS

| 5,822,499 A | | 10/1998 | Okada et al. ................. 358/1.1 |
| 5,873,659 A | * | 2/1999 | Edwards et al. .............. 400/61 |
| 5,918,988 A | * | 7/1999 | H.A.M. Van Oijen ........ 400/76 |
| 2002/0118387 A1 | * | 8/2002 | Patton ....................... 358/1.15 |
| 2002/0135792 A1 | * | 9/2002 | Sommer et al. ........... 358/1.13 |

FOREIGN PATENT DOCUMENTS

| DE | 197 18 417 A | 11/1998 |
| WO | WO 96/18143 A | 6/1996 |

* cited by examiner

Primary Examiner—Minh Chau
(74) Attorney, Agent, or Firm—Birch, Stewart, Kolasch & Birch, LLP (57) ABSTRACT

A method of managing a printing system in which print jobs are disposed with a print queue, wherein a so-called "acting object", is provided within the print queue to behave as a separate job, and is operative for specifying one or more system commands, without further specifying a actual print job. When the acting object reaches the top of the print queue, its system command is executed. Examples of such system commands are an interruption of the print queue processing or a change of default printing and/or printer parameters.

16 Claims, 4 Drawing Sheets

CONTROLLING A PRINTING SYSTEM USING THE PRINT QUEUE

BACKGROUND OF THE INVENTION

This application is the national phase under 35 U.S.C. § 371 of PCT International Application No. PCT/EP02/03159 which has an International filing date of Mar. 15, 2002, which designated the United States of America. This application also claims priority of Application No. 01201059.1 filed in Europe on Mar. 20, 2001 under 35 U.S.C. § 119.

FIELD OF THE INVENTION

The present invention relates to a method for managing a printing system, comprising building up a print queue by creating print jobs and appending each print job to the print queue as a print queue element, wherein print jobs are created by specifying for each print job, print data and a set of processing parameters, and displaying a representation of the print queue on a display screen of a user interface, wherein the printing system successively handles the print queue elements in the order in which they appear in the print queue.

RELATED ART

Present-day high-volume printers allow the pre-programming of multiple print jobs and the subsequent printing of such jobs in an unattended operation on the level of a separate print job. The operator keeps the queue in condition for maintaining maximum throughput. The term "printer" as used herein refers to any kind of hard copy image reproducing machines, such as, inter alia, including digital copying machines.

The present inventors have recognized that quite often, the printer should allow for redefining system parameters or printing parameters between the execution of successive print jobs, even after such printing jobs have been specified. In consequence, there exists a need for allowing as it were, an intermission in the printing proper, while letting the printing go on uninterrupted until the planned intermission. The redefining would then proceed in the intermission, either automatically or by the action of an operator.

SUMMARY OF THE INVENTION

It is an object of the present invention to allow for the insertion of a system command into the print queue without disrupting the pre-existent organization of the actual print queue.

According to one aspect of the present invention, a so-called "acting object" is created by means of a user interface, wherein the acting object is created by specifying one or more system commands, without further specifying print data, and inserting the acting object into the print queue as a print queue element, and distinguishably displaying the acting object as a member of the print queue on the display screen of the user interface. The printing system, when the acting object comes into the stage of being handled, executes the one or more system commands specified in the acting object. The acting object, as herein defined, allows for the introduction of a broad variety of operations that have proved useful in present-day printing facilities. One such operation would be a change of the default configuration of the printing system. Default configurations comprise sets of instructions for controlling the printing operations performed by the system, including, for instance, fonts, paper sizes, page description languages and finishing options. Other examples of operations that would be performed by an acting object as herein defined, are suspending the queue handling, such that the machine passes into a stand-by state, giving an operator the opportunity to change the printing paper in one or more of the paper trays or perform other operations, or shutting down the system, an operation that would typically be programmed at the end of the day, behind the last print job in the queue, such that the operator does not have to wait for the system to finish the queued print jobs before he can leave.

Earlier art has provided for an "emergency stop". This emergency stop will interrupt an ongoing print job, which could thereby introduce unwanted interference with the intended printing result and is thus not suitable in most cases.

Furthermore, Patent Application WO 96/01456 discloses a system wherein a workstation user selects a default configuration for a particular print job by submitting it to a specific one of a plurality of communications protocol addresses assigned to one printer. Each address corresponds to a specific configuration of the printer. Print jobs submitted via different addresses are nevertheless entered into the print queue as received. Thus, certain job positions in the print queue will have their idiosyncratic printer configurations.

In addition, U.S. Pat. No. 5,822,499 discloses a set-up job of a printing job, and more particularly, a modification of the set-up job. Nevertheless, such a set-up job is part of the print job, and cannot be considered as a totally separate job like the above-defined "acting object".

Finally, WO 96 18143 A of applicant discloses the repeatedly printing of a same original image, the printing being successively performed with changed printing specifications. Here also, the printing specifications are part of the print job.

In contradistinction thereto, the present invention allows to uncouple the specifying of system commands from the print jobs themselves through, inter alia, specifying the acting object described above as some kind of a dummy print job. This feature could of course be combined with the teachings of prior art.

The acting object may be defined at any suitable position in the print queue, and would thereby allow for an enormous flexibility on various different levels of printer operation, such as, the conditions of the printing proper, the printer conditions, such as, the availability or unavailability of printing materials, priority jobs, repair or maintenance, and various other printer conditions.

The invention also relates to a printer control mechanism, to a printer server facility, and to a printer, which are arranged for implementing various aspects of the present invention. Further, the present invention relates to computer software to be used for programming a system controller to implement the various aspects of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
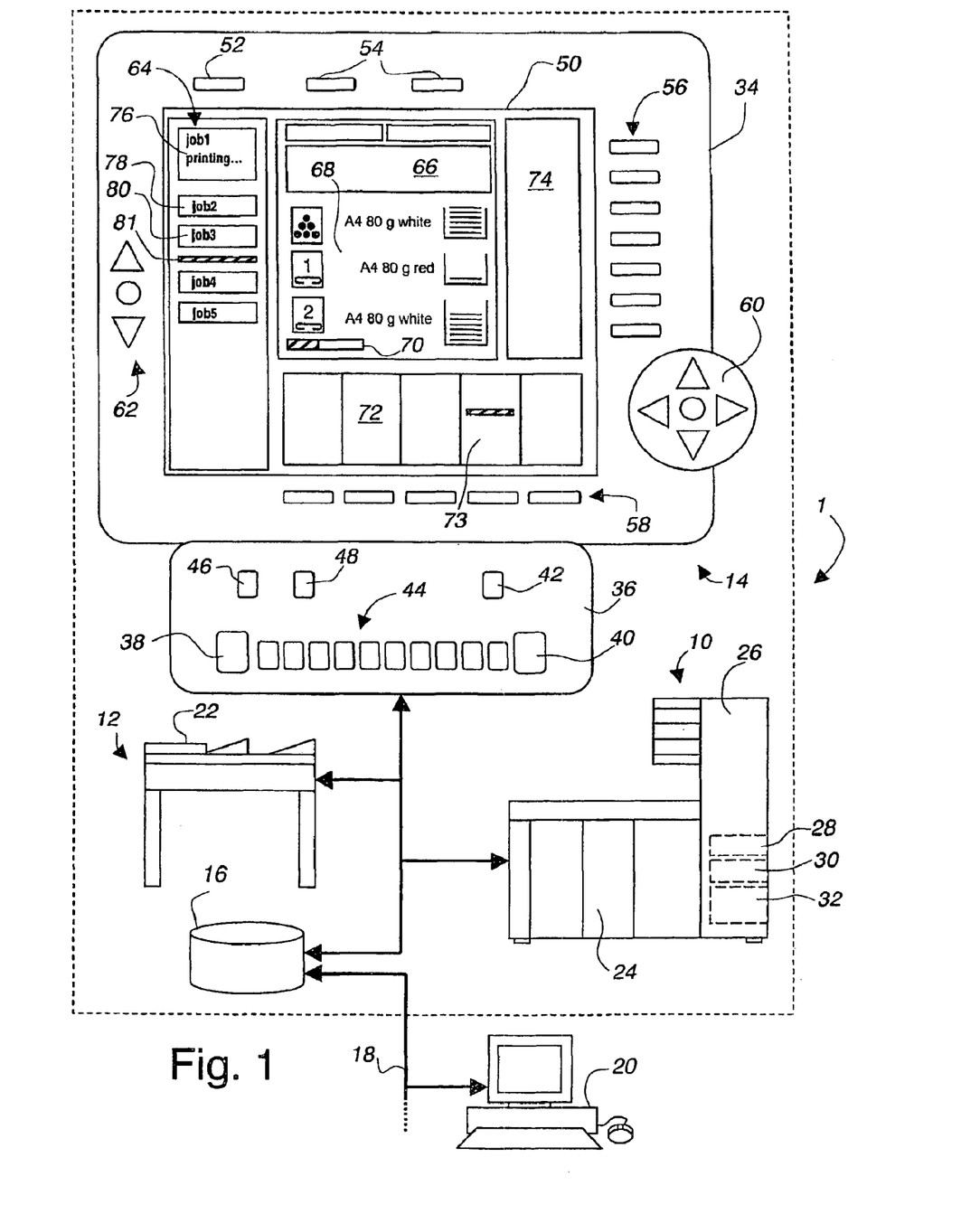
FIG. 1 is a block diagram of a printer in which the invention is implemented.

FIG. 1 illustrates a block diagram of a printing system 1 in which the invention is implemented.

In the example shown in FIG. 1, a high production printer 10 and a scanner 12 are installed as separate units but physically close to one another in a Central Reproduction Department (CRD). The printer 10 and the scanner 12 are jointly operated from an operating console 14 which is installed in the same CRD.

The scanner 12 and the printer 10 which, in combination, form a copier/printer, are directly connected to one another and are further connected to a mass memory 16, e.g. a storage disk in which image and text data to be printed may be stored. The mass memory 16 is also accessible through a network 18, for external workstations 20 that may send print jobs to the system. The memory 16 includes so-called "mailbox" sections for storing image data that are not to be printed immediately. Images scanned by the scanner 12 may either be transmitted directly to the printer 10 or may be temporarily stored in a "local mailbox" section of the memory 16 to be printed later. Likewise, print files received over the network 18 may either be transferred directly to the printer queue or be stored in a "network mailbox" section of the memory 16 for later printing under the control of the operation console 14.

The scanner 12 has a glass platen (not shown) and an automatic document feeder 22, so that an original document that has been inserted into the feeder 22 and may consist of several single-sided or double-sided sheets, can be scanned-in automatically. In addition, it is possible to deposit documents to be scanned manually on the glass platen, after the feeder 22 has been lifted.

The printer 10 comprises a print engine 24 and a finisher 26 in which the stacks of printed copy sheets may be subjected to various finishing procedures such as a stapling, punching, or binding, in accordance with print parameters specified for the various print jobs. The printer 10 further has three trays 28, 30 and 32 for accommodating copying sheets of different sizes and/or qualities. In the example shown the tray 32 has a larger storage capacity than the other two trays 28, 30. As is generally known in the art, each tray has sensors for automatically detecting the size of the sheets that are presently accommodated therein. The "qualities" of the copying sheets may differ in color, paper weight and material, including also non-paper materials such as transparencies.

The operating console 14 comprises a monitor 34 and a keyboard 36. As is well known in the art, the keyboard 36 includes a start key 38, a cancel key 40, a stop key 42 and ten digit keys 44. In addition, there is provided an import key 46 which is used for importing a file from the mailbox or from the scanner 12 and appending it to the current print job. A help key 48 serves for calling for online help which will then be displayed on the monitor 34. Keyboard 36 may also include character keys (not shown).

The monitor 34 has a display screen 50 with a large display area formed for example by an LCD, as well as a number of keys disposed on a frame around the screen 50. These keys comprise a key 52 for calling-up a job manager, and three groups of soft keys 54, 56 and 58 which are disposed near the top, right and bottom edges of the screen 50 and the functions of which will depend on the contents displayed on the screen 50. A key cross 60 may be used for incrementing or decrementing numerical values such as a magnification ratio and the like or for shifting a cursor on the screen 50 and for activating selected objects, as is known in the art. A set of arrow keys 62 is arranged near the left edge of the screen 50 and serves for selecting jobs from a print queue 64 that is displayed in the form of a job list on the left margin of the screen 50, i.e. right below the job manager key 52.

The image on the screen 50, as shown in FIG. 1, is a standard screen image which permits the operator to monitor the status of the printer and from which he may start with creating new print jobs, if desired. This screen image includes a message window 66 in which text messages can be displayed, and a display area 68 which synoptically shows any possible demand for operator intervention.

In the right part of the display area 68, the amounts of copy sheets available in the three trays 28, 30 and 32 are shown symbolically, and the contents of the various trays are indicated. In the example shown, the first tray 28 and the large third tray 32 are loaded with white paper having size A4 and a paperweight of 80 g/m2, whereas the second tray 30 is loaded with A4 red paper. It can further be seen that the supply of the A4 red paper in the tray 30 is about to run out. Should this tray actually become empty, the corresponding symbol in the display area would be emphasized, e.g. by turning red, and the operator would be alerted to refill this tray. Similarly, three symbols in the left part of the display area 68 light up when it is necessary to refill toner or to refill a first or a second staple magazine provided in the finisher 26. A bar diagram 70 in the lower left corner of the display area 68 shows the amount of disk capacity of storage disk 16 on which the image data received from the scanner 12 are stored temporarily before they are printed out by the printer 10.

Below the display area 68, there are shown a number of job templates 72 each of which is associated with one of the soft keys 58. The job templates 72 represent predefined sets of print parameters which are frequently used in practice. Each of the print templates is identified by a name and an appropriate symbol, although this has not been shown in the drawing. Thus, the operator may easily specify a set of standard parameters for a new print shop by pressing the soft key 58 associated with the desired job template 72. In the example shown a job template 73 is dedicated to define a so-called "acting object" in the print queue, as will be described below.

Once a job template has been selected, the print parameters specified therein may be edited.

A window 74 on the right margin of the screen 50 is used for specifying the functions of the soft keys 56. These functions may among others be used for calling-up specific options in conjunction with the parameter settings.

In the print queue 64, each print job is represented by a small rectangular window 76, 78 or 80, in which the job is identified. In addition, an acting object 81, to be described below, is shown in the queue. The sequence in which the jobs will normally be processed corresponds to the sequence from the top to the bottom in the print queue 64. A window 76 corresponding to the first job in the queue has an enlarged height which indicates that this job is active, i.e. is currently being printed. The larger area of the window 76 permits more detailed information to be indicated on the active job. The smaller windows (78, 80) relate to jobs that are waiting in the print queue.

Now, according to the present invention there is introduced a so-called acting object, that may be inserted into the print queue and that behaves within the print queue as a separate job. It does, however, not specify an actual print job, but instead one or more system commands. During the printer operation, the acting object moves up the print queue together with the other queue objects, i.e. print jobs, and when it reaches the top of the queue, it gives the system command that it contains.

The acting object, as herein defined, allows the introduction of a broad variety of operations. One such operation would be a change of the default configuration of the printing system. Default configurations comprise sets of instructions for controlling the printing operations performed by the system, including, for instance, fonts, paper sizes, page description languages and finishing options. Other examples of operations that would be performed by an acting object as herein defined, are suspending the queue handling, such that the machine passes into a stand-by state, giving an operator the opportunity to, for instance, change the printing paper in one or more of the paper trays or perform other operations, or shutting down the system.

Figure 2:
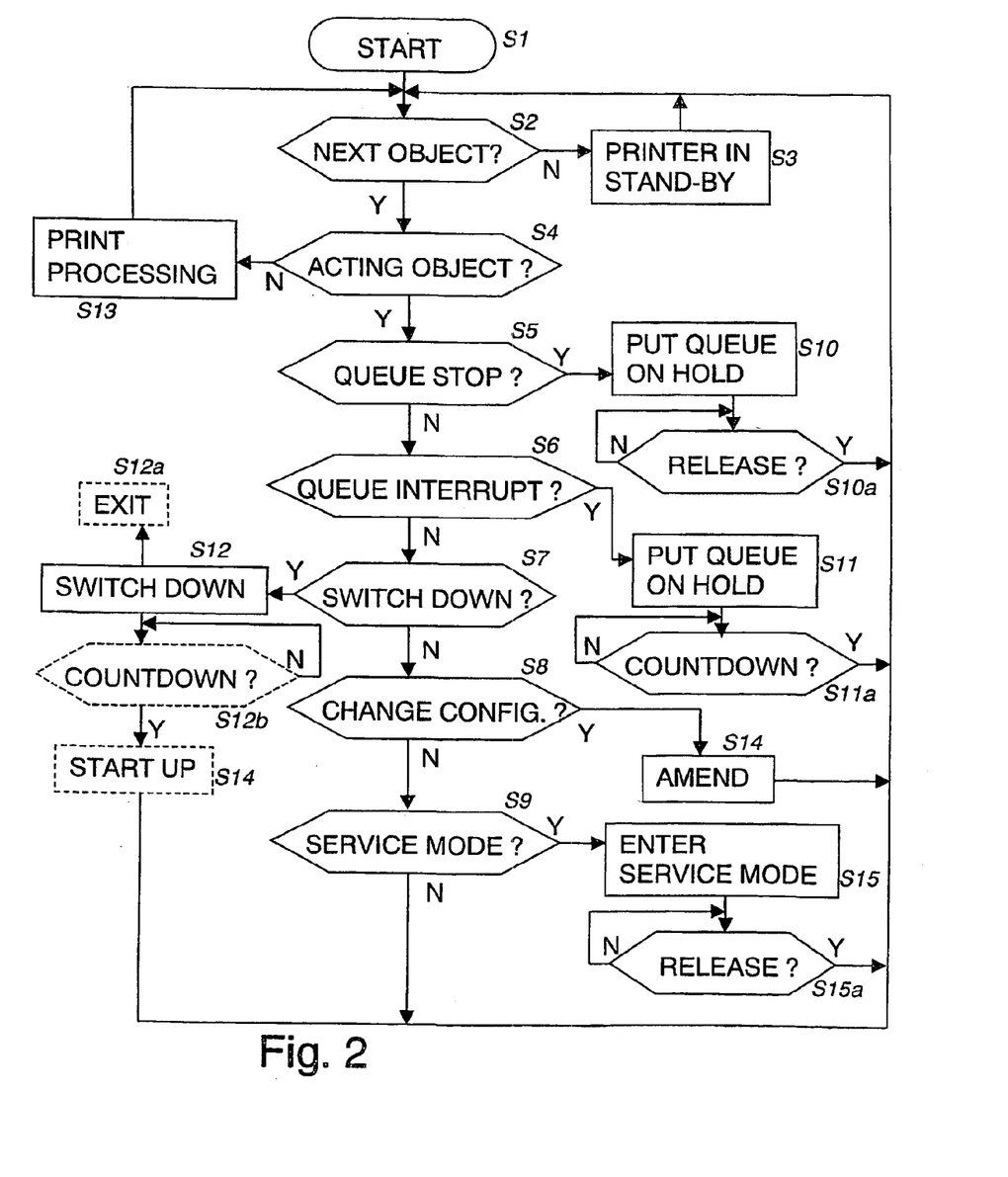
FIG. 2 is a flow chart of the queue processing in a printing system according to an embodiment of the present invention.

FIG. 2 illustrates a flow chart of the queue processing in a printing system according to an embodiment of the present invention. In block S1, the operation is initiated, and the required hardware and software facilities are assigned.

In block S2 it is checked as to whether there is an object (or, when returning from processing a previous object, a subsequent object) present in the print queue. If this check is negative, the printer is brought (or left) in a stand-by mode in block S3 and the system enters a waiting loop in anticipation of new print jobs. If the check is positive in block S2, in block S4 it is detected whether the next object in the queue is a so-called "acting object" according to the present invention. If negative, the next object is a print job, and the system proceeds to a print process in block S13, following the routes of the prior art, or alternatively, those of copending European Patent Application No. 01201059.1, priority filing date 20 Mar. 2001, assigned to the present assignee. At the end of the printing process, the system returns to step S2

If the acting object is positive in block S4, the acting object in question is checked as to which system commands it actually specifies. In block S5, it is checked whether the acting object specifies a queue processing stop. If positive, the system proceeds to block S10, puts the queue on hold (that is, no further print jobs are processed, but the printer is kept ready to start a new job upon command), and waits, in a waiting loop represented by step S10a, for a release command from the operator, such as the operation of an appropriate key in the monitor 34. Upon such a command, the system proceeds to step S2.

If negative in block S5, in block S6 it is checked whether the acting object specifies a queue processing interrupt, i.e. a temporary queue processing stop, that is maintained for a time duration that has been input by the operator. If positive, in block S11 the queue processing is halted and a count register not shown is loaded with a value representing the inputted time duration of the interrupt. Furthermore, the remaining time is periodically decremented as is indicated by return path S11a that effectively represents a waiting loop. Upon attaining the ultimate state of the countdown, i.e. the remaining time becomes effectively zero, or upon a release command analogous to that of step 10a, whichever occurs earlier, the system reverts to block S2 discussed above and checks for a new queue object. The automatic resuming of the printer operation could occur around the start of the next working day or at another suitable instant.

If negative in block S6, in block S7 it is checked whether the acting object specifies a switch down command. Such switch down may specify any of various print system states wherein the operativity is less than a standard level, such as power off, low-power mode (also known as "sleep mode"), printing only allowed in case of certain high-priority operations, or with a certain reduced functionality level. If positive, the system proceeds to block S12, where the relevant switch down mode is entered. The switch down mode may be entered either definitely, as represented by step S12a, or for a specified time duration only, after which the printer is started up again, as shown in steps S12b and S14, the alternatives being shown in broken lines.

The features of blocks S5, S6, S7 allow the implementation of the halting of the printer system after a specific print job. The selection among these three types of specifying commands allows one to discriminate between final halt, temporary interrupt, and temporary halt or another switch-down state.

In block S8, it is checked whether the acting object specifies a configuration change of the printer system, such as defining another feeding tray as default. Generally, such configuration changes imply changes of the default configuration. The default configuration becomes operative when the print job does not completely specify the configuration. If positive, in block S14 the configuration is amended and the system proceeds to block S2 to look for the next object.

In block S9, it is checked whether the acting object specifies a change to a system mode, in which a service engineer can do maintenance work. If the acting object specifies a change to the service mode, the system stops the queue processing and passes into the service mode (S15). In this mode, copy or print processes can be started from the operating console 14 for checking system behaviour. After the work has been finished, the engineer releases the system in step S15a, and the queue processing is automatically resumed in step S2.

FIGS. 1 and 3–7 illustrate various screen images used for implementing the present invention. FIG. 1 illustrates the print command definition screen that in particular shows the print queue 64 with objects such as copy or print jobs 76, 78, 80, and acting object 81, and furthermore command templates 72, including acting object command template 73. The different shape of the acting object as shown does not mean that it is restricted to a physical size that is less than that of the other objects 76, 78.

Figure 3:
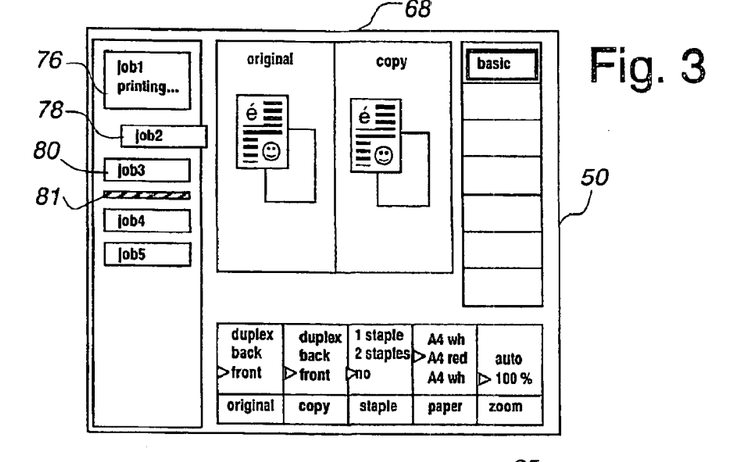
FIGS. 3, 4, 5, 6 and 7 show various screen images used for implementing the present invention.

FIG. 3 shows the display screen 50 of the monitor 34 (FIG. 1) after print job object 78 has been selected and opened. The selecting is accomplished by stepping through the upper and lower buttons of the set 62 in FIG. 1, whereas the opening and closing is effected through the central button of the set 62, that functions as a toggle. The selecting of a particular queue object will highlight that object, such as by changing its intensity. The opening proper in this embodiment is indicated by displacing the basic representation of the object somewhat to the right and, furthermore, by displaying various data or aspects regarding the settings of the job in question in the display area 68 and the rest of the display screen 50 apart from the print queue area 64. The settings may be changed by operating the keys 58 on the monitor 34. More details about the job may be presented on the display screen after operating the keys 56.

Figure 4:
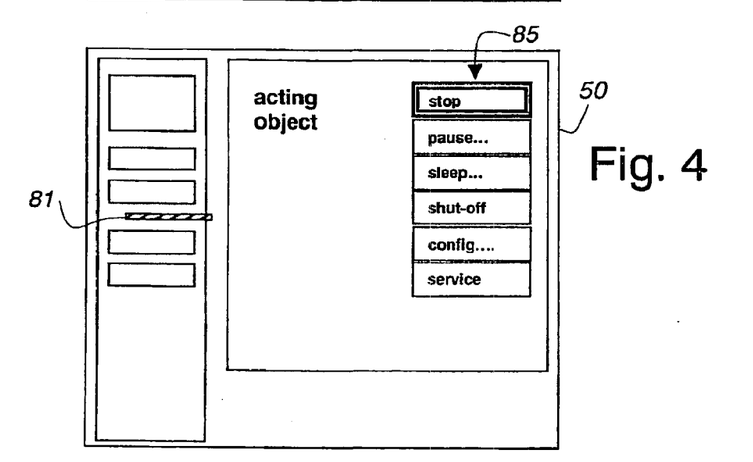

FIG. 4 shows the display screen 50 after the acting object 81 according to the present invention has been selected and opened, which is shown by the acting object's representation being displaced somewhat to the right. The selection blocks in column 85 indicate the various system commands that may be specified in this particular acting object. As shown, these are "stop", "pause" with time parameter value, "sleep" with a time parameter value, "shut-off", "configuration" with one or more parameter values, and "service". Their impact on the system has already been explained with reference to FIG. 2. Any of these system commands could additionally imply the generating of a user notification, such as by a beep or bell, a message on the display screen 50, and/or a message to a mobile device such as a mobile phone.

The system commands in FIG. 3 are given only by way of example. Other examples can be contemplated by a skilled person.

Another system command, although not shown in FIG. 3, would be a simple acoustic alarm. An operator would for instance insert this acting object after a specific job to which he wants to give special after-treatment. The system would them warn him at the moment he is to take further action.

Another system command, not shown in FIG. 3, would be a bundle-defining acting object. By placing such an acting object before a series of print jobs in the print queue, and another one after the series, this series of jobs is redefined as a single print job. When this kind of acting object is selected and inserted, a settings window is automatically opened on the display screen for defining the finishing parameters for the newly defined job.

Yet another instance of an acting object, also not shown in the figures, would be a command to fetch a specific print data file from the network mailbox section of the memory 16. Normally, a remote user may submit a print job to the printer system, which will either store it in the network mailbox or pass it on to the print queue directly. In the former case, an operator at the system console must move a stored remote print job from the network mailbox to the print queue. He may, however, also define an acting object that includes the file name of the remote print job which fetches a file of that name from the network mailbox at the moment it reaches the top of the queue. This may be handy in the case where a user is still working on the print job, but needs to have the job printed as soon as possible after it has been finished. In a production environment, where normally large jobs are printed, when the job is appended at the end of the queue, it may take much time before is it handled. In that case, this specific kind of acting object may reserve a place in the queue, while the user has time to finish his job and submit it. Of course, when the print file has not yet arrived at the moment the acting object reaches the top of the queue, the reservation will be ignored, and the following object in the queue will be processed.

It would also be feasible to adapt a printer driver in a remote workstation in such a way that it is able to submit this kind of acting object to the printer. If the system is in the mode in which it directly passes print jobs to the print queue, the system controller would also put the acting object into the queue, where it would then act in the way described above. In this way, a remote user may first send a reservation object to the printer and then the print file, when it has been finished.

Figure 5:
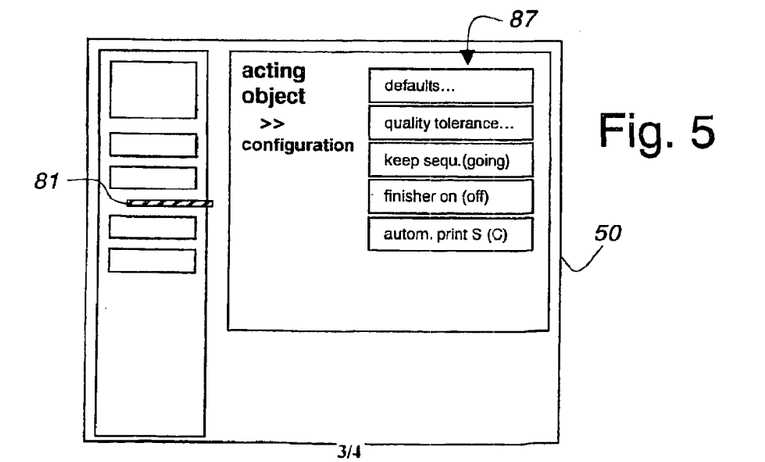

As shown in FIG. 4, the first system command "stop" of these six commands has presently been selected. System commands may require parameters to be input for further specifying their action on the system. For instance, the "pause" command requires a time duration to be input. Such commands are recognizable as such by a line of dots at their ends, as is usual in Windows™ systems. When such a command, is selected, e.g. the "config . . . " (configuration change) command, a specification window opens up automatically, as shown in FIG. 5. This specification window shows a column 87 of secondary specifying blocks that respectively contain:

"defaults", with parameters to be specified; this will explained in detail below;

"quality tolerance", with parameters to be specified; gives the opportunity to ignore alarms such as "toner exhausted" or "staples exhausted", that would otherwise halt the machine for refill or other maintenance;

"keep sequence/keep going" this is a toggle function; in the "keep sequence" mode, the printer will stop when the next job cannot be printed according to the job settings, whereas in the "keep going" mode, the printer will skip such jobs and print all other printable jobs;

"finisher on/off" that is a toggle function; this command is for switching an external finisher on or off via the printer system controller; such machines make noise and use electricity and therefore should only be switched on when they are needed for finishing a print job; and "automatic print Y/N" this is also a toggle function; print jobs that are submitted from one of the workstations may be handled automatically, i.e. placed in the print queue without operator interference, or may be diverted to the "network mailbox" section of the memory 16 (FIG. 1). The list of secondary specifications above is merely a non-exhaustive example.

Another system configuration item, although not shown here, would be connecting or disconnecting the system to/from the external network, such that remote print jobs can or cannot be received.

Figure 6:
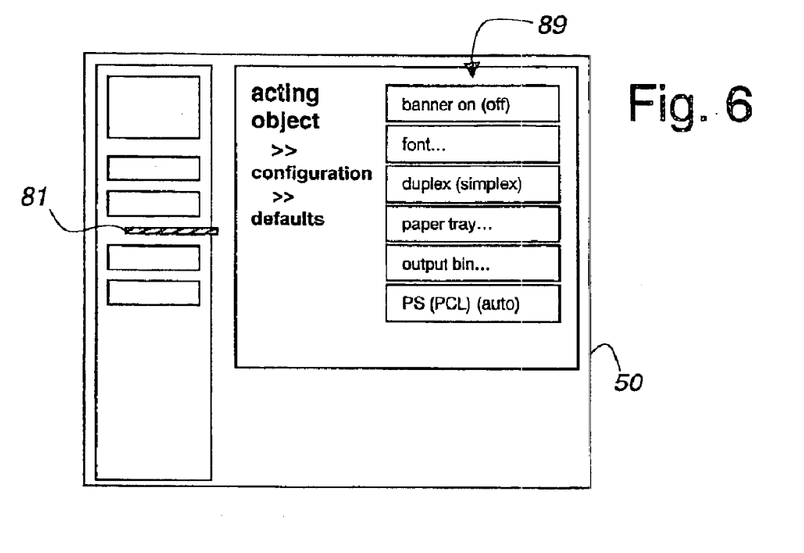

FIG. 6 shows the next lower level in the hierarchical selection tree, where the block "defaults" has been selected. This will display the blocks of column 89, that respectively specify default printing parameters that will automatically be applied by the system controller when such has not been defined in a print job:

"banner page on/off" this is a toggle function,

"font" with one or more parameters, such as the name of the font and the character size, "duplex/simplex", this is a toggle function, defining double or single sided printing, "paper tray" that selects the default input tray of printing material, "output bin" that selects the default output bin, and "PS/PCL/auto", this is a cyclic function defining the page description language (pdl) (Postscript or PCL in this example) that incoming print jobs are assumed to have; when a print file is to be interpreted, the selected interpreter is started up; in the "auto" mode, a print file is first analysed by an emulation sensing function that automatically determines the pdl of the file, upon which the relevant interpreter is started up.

Again, the list above is merely a non-exhaustive example.

Through migrating in the tree of which a few branches have been indicated in the foregoing, an operator may selectively specify any number of system commands, and as required various parameter values for selected commands.

For a system command that is selectable at a deeper level of the selection tree, but is nevertheless frequently used, it would be feasible to place a "shortcut" selection box on the highest selection level (cf. FIG. 4). One possible way to implement placing such a shortcut would be double-clicking on the deep-level selection box, but other ways of implementing this feature would be obvious for the skilled person.

Figure 7:
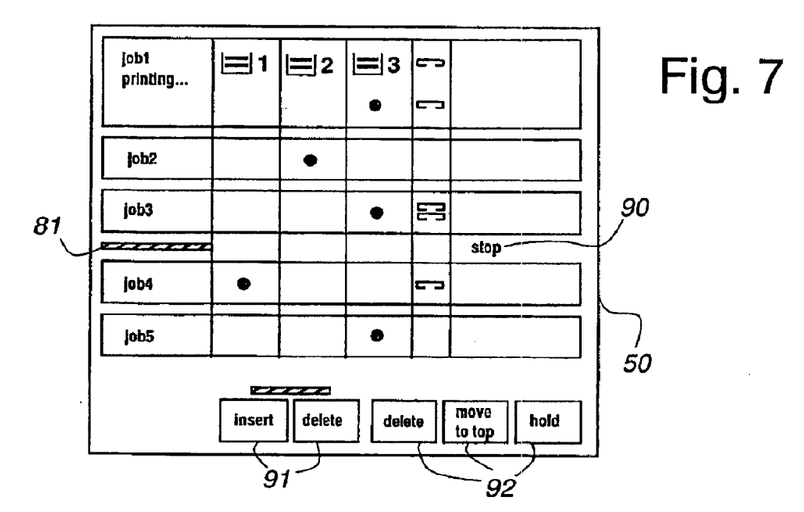

FIG. 7 shows the display screen associated to the job manager of the printing system. This screen may be entered immediately from the screen of FIG. 3 by appropriate manual activation of one of the keys 54 by an operator. As shown, this will extend the job windows of FIG. 3 to filling substantially the whole width of the screen by specifying some of the job parameters for each job. In particular, the paper tray(s) used for the job are named and the staple setting is shown. Furthermore, the acting object is shown and identified as containing the system command "stop" (in this example) by a caption 90 at the right on the screen. When opening the object, the above-discussed tree will be rendered operative.

The display screen in FIG. 7 shows a way of manipulating print jobs and acting objects, additional to the insert function described with reference to FIG. 1. In particular, by vertical cursoring it is possible to position an acting object between two presently existing jobs in the print queue. Soft keys as shown at 91 allow an acting object to be inserted or deleted. Other soft keys 92 are used to delete a selected print job from the queue, move a print job to the top of the queue, or to put a print job on hold, which then will not be executed. Other operations could include stepping upwards or downwards, splitting, and such other variations that would be recognized by a person skilled in the present art upon reading the instant disclosure.

The method according to the present invention may be applied in various situations. A first one is when the control mechanism operates at the interface of a single printer and a single operator console for that printer. In fact, the operator will be relieved from such tasks as continually monitoring the various print jobs, in that the invention provides for through appropriate system commands amending various aspects of the overall system to suit job-associated and/or external requirements, that may apply either at the beginning of a print job, such as by specifying a default feeding tray, or at the end of a print job, such as by defining finishing parameters.

Figure 8:
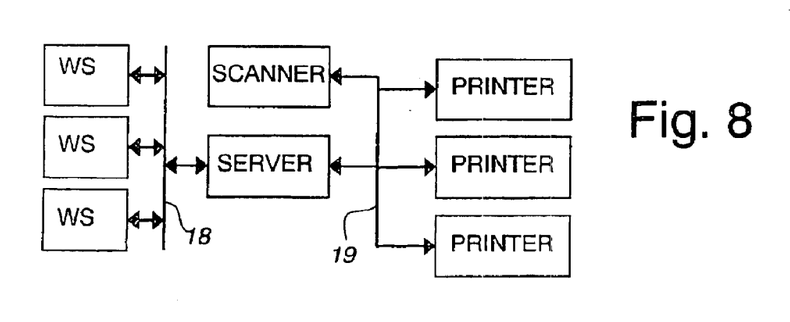
FIG. 8 shows an arrangement of printers and a printer server according to the present invention.

The present invention can also be applied in a more extended setup, such as when a printer server is arranged for serving a plurality of printers, each having their own print queues with associated acting objects. This is shown in FIG. 8, where a scanner and a plurality of printers are connected to the server via a local network 19. The server is also connected to an external network 18 for communicating with user workstations WS.

The printer control mechanism can be a specific programmed hardware element. In other circumstances, the hardware could be more or less general, whereas the proper functionality is attained through loading or configuring the hardware through an appropriate computer program product, such as a loaded floppy or CD-ROM.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for managing a printing system which comprises:
   building up a print queue by creating print jobs and appending each print job to the print queue as a print queue element, wherein print jobs are created by specifying for each print job, print data and a set of processing parameters;
   displaying a representation of the print queue on a display screen of a user interface, whereby the printing system successively handles the print queue elements in the order in which they appear in the print queue;
   creating, by means of the user interface a so-called "acting object", said acting object being created by specifying one or more system commands without further specifying print data;
   inserting the acting object into the print queue as a print queue element; and
   distinguishably displaying the acting object as a member of the print queue on the display screen of the user interface, wherein the printing system, when the acting object comes into the stage of being handled, executes said one or more system commands specified in the acting object.

2. The method of claim 1, further comprising inserting the acting object between two presently existing jobs in the print queue.

3. The method of claim 1, wherein the acting object specifies a queue processing stop command or a queue processing interrupt command, or a printer switch-down command.

4. The method of claim 3, wherein the acting object specifies a printer condition which permits operator intervention.

5. The method of claim 1, wherein the system command defines a system configuration change.

6. The method of claim 1, wherein the system command defines a value for one or more default printing parameters.

7. The method of claim 1, wherein the acting object specifies a particular printer state and a time interval regarding the maintaining thereof.

8. The method of claim 1, wherein the acting object specifies a particular printing condition or printer configuration.

9. The method of claim 1, wherein the acting object specifies a user notification command.

10. The method of claim 1, wherein one or more of the system commands specify one or more associated parameter values.

11. The method of claim 1, further comprising a user interface for inserting and removing the acting object in the print queue.

12. The method of claim 1, further comprising a single user interface for controlling the print queues of a plurality of physically separate printers.

13. A computer readable program for implementing the method of claim 1.

14. A printer control mechanism which comprises:
   a printing system which includes a print queue which contains print jobs appended thereto as a print queue element, said print jobs being created by specifying for each print job, print data and a set of processing parameters;
   means for displaying a representation of the print queue on a display screen of a user interface, whereby the printing system successively handles the print queue elements in the order in which they appear in the print queue;

an "acting object" provided within the print queue as a print queue element said "acting object" being created by means of the user interface and by specifying one or more systems commands without further specifying print data; and means for distinguishably displaying the "acting object" as a member of the print queue on the display screen of the user interface, wherein the printing system, when the "acting object" comes into the stage of being handled, executes said one or more system commands specified in the "acting object".

15. A printer containing the print control mechanism of claim 14.

16. A printer server comprising the print control mechanism of claim 14, which acts to serve one or more physically distinct printers.

* * * * *